United States Patent [19]
Nakamoto

[11] Patent Number: 5,471,600
[45] Date of Patent: Nov. 28, 1995

[54] ADDRESS GENERATING CIRCUIT USING A BASE POINTER OF LOOP AREA

[75] Inventor: Takashi Nakamoto, Tokyo, Japan

[73] Assignee: NEC Corporation, Tokyo, Japan

[21] Appl. No.: 392,420

[22] Filed: Feb. 22, 1995

Related U.S. Application Data

[63] Continuation of Ser. No. 812,706, Dec. 23, 1991, abandoned.

[30] Foreign Application Priority Data

Dec. 29, 1990 [JP] Japan ................................ 2-417198

[51] Int. Cl.⁶ .................................................. G06F 12/00
[52] U.S. Cl. .................... 395/405; 395/375; 395/421.09; 395/421.08
[58] Field of Search ..................... 395/400, 425; 364/200 MS File, 900 MS File, DIG. 1, DIG. 2

[56] References Cited

U.S. PATENT DOCUMENTS

| | | | |
|---|---|---|---|
| 4,024,507 | 5/1977 | Berkling et al. | 395/775 |
| 4,477,878 | 10/1984 | Cope | 364/726 |
| 4,602,328 | 7/1986 | Finger et al. | 395/400 |
| 4,677,547 | 6/1987 | Omoda et al. | 395/800 |
| 5,083,267 | 1/1992 | Rau et al. | 395/375 |
| 5,150,471 | 9/1992 | Tipon et al. | 395/400 |
| 5,155,823 | 10/1992 | Tsue | 395/400 |

*Primary Examiner*—Jack A. Lane

[57] ABSTRACT

An address generating circuit includes a latch circuit and two adder/subtractors. The inputs of the first adder/subtractor are from the latch circuit and from a distance relative to a value of a base pointer, and the output computes an address. The second adder/subtractor uses loop width information to adjust the computed address of the first adder/subtractor so that it falls within a loop area.

6 Claims, 5 Drawing Sheets

ADDRESS GENERATING CIRCUIT USING A BASE POINTER OF LOOP AREA

This is a continuation of application Ser. No. 07/812,706, filed Dec. 23, 1991 now abandoned.

BACKGROUND OF THE INVENTION

The present invention relates to an address generating circuit, and in particular, to an address generating circuit suitable for addressing of a data random-access memory (RAM) used in a signal processor.

DESCRIPTION OF THE PRIOR ART

As an application example of a signal processor, there has been known a digital filter which processes signals sampled at a predetermined interval. The digital filter achieves the signal processing basically depending on the following formula.

$$\sum_{i}^{t} a_i x_i$$

Namely, in the processing, input signal data items $x_i$, accumulated for each arbitrary sampling period are respectively multiplied by coefficients $a_i$ such that the respective multiplication results are added to each other. The signal processor in this operation stores the input signal data items $x_i$ in a data RAM at a preset sampling interval. In an ordinary case, the data items are sequentially loaded therein in an order of addresses as $x_n$, $x_{n-1}$, $x_{n-2}$, ... $x_o$, where $x_n$ stands for a signal obtained in an n-th last sampling operation. In a sampling period, the system accesses the data RAM to read therefrom the sampling values ranging from the value $x_n$ of the n-th last sampling operation to the value $x_1$ of the last sampling operation so as to compute the total $\Sigma a_i x_i$ above. At the same time, data $x_o$ obtained in the present sampling operation is written in the data RAM.

For example, assume that in a sampling period fs(P) of a sampling operation conducted with a sampling cycle fs, the data RAM is loaded with data $x_n$ attained in a sampling period preceding the current period by nfs at an address m thereof, data $x_{n-1}$ obtained in a sampling period preceding the current period by (n–1)fs at an address M+1, and the subsequent data items in a similarly manner such that data $x_1$ acquired in a sampling period preceding the current period by 1fs at an address (m+n–1). In this situation, in the sampling period fs(P), the system sets m as the address of the data RAM to read data $x_n$ therefrom. Next, m+1 is set as the RAM address so as to obtain data $x_{n-1}$ beforehand stored therein. This operation is successively accomplished by incrementing the value of the read address for each data read operation. When the operation is achieved n times, the data RAM is loaded with data $x_o$ at an address m+n, the data $x_o$ being presented by an input signal attained in the present sampling period fs(P). In the subsequent sampling period fs(P+1), since data stored in the address m of the RAM is a signal obtained in a period preceding the current period by (n+1)fs and data at the address m+1is a signal attained in a period preceding the current period by nfs, the system achieves processing in the sampling period fs(P+1) as follows. An address value m+1is set as the address of the data RAM to read data $x_{n-1}$ developed in a period preceding the current period by nfs therefrom and then a value m+2 is set as the read address to obtain data $x_{n-2}$ developed in a period preceding the current period by (n–1)fs. Namely, the address specification disadvantageously varies between the sampling periods fs(P) and fs(P+1).

Conversely, when it is desired to apply an identical addressing to the processing in the sampling periods fs(P) and fs(P+1), for each of n data items, it is required to transfer data $x_{n-1}$ which is at the address m+1in the sampling period fs(P) to the address m.

In this situation, in order to use an identical address assignment to the processing in the sampling periods fs(P) and fs(P+1) while unnecessitating the data transfer operation above, there has been employed in some cases a system configuration including a base pointer loaded with a content which is incremented by one for each sampling period such that the address is specified depending on a distance from a value indicated by the base pointer; moreover, the address value is varied based within a width in a loop form or in a periodic manner, the width including words not less than the n words required to store the content of the base pointer therein.

The address generating method above has been conventionally achieved by an address generating circuit as follows.

FIG. 4 shows an RAM map employed when a data RAM includes a plurality of loop areas above.

In the memory layout of FIG. 4, the upper-limit value indicates an upper limit of the address of the loop area, the lower-limit value designates the lower limit of the address of the loop area, the bank number denotes a number assigned to a loop area, and B0 to B3 stand for values of the respective base pointers.

For example, in the case of the second loop area, the number assigned to the loop area, namely, the bank number is "1", and the upper-limit and lower-limit of address are designated as T1 and B1, respectively.

In the case where the addressing is conducted in the second loop area assigned with the bank number 1, namely, where an address is specified by a distance d relative to the position indicated by the content of the base pointer, an address generating circuit is required to generate an actual address associated with the relative address above. FIG. 5 shows an example of a conventional address generator employed for the addressing.

Next, a description will be given of the address generator circuit of the prior art by reference to FIG. 5. This circuit receives as input signals indicating a bank number specifying a loop area, a distance d relative to a position indicated by the base pointer, and a signal ± representing a direction related to the distance d. The bank number is supplied to a selector circuit 202, an upper-value hold circuit 205, and a lower-value hold circuit 206. The distance d and the signal ± representing a direction of the distance d are inputted to an exclusive OR (EXOR) gate 204.

First, a base pointer BP1 of a loop area specified as a bank number "1" by a latch circuit 201 keeping a value of a base pointer is selected by the selector circuit 202. On the other hand, the distance d from a position designated by the base pointer BP1 is fed to one of the inputs of the EXOR gate 204. In this situation, when the distance d is represented as a binary value which is data of width of a plurality of bits, the EXOR gate 204 achieves processing for all of the plural bits. The remaining input of the EXOR gate 204 is supplied with the signal ±, which takes a value "1" or "0" when the distance d relative to a position denoted by the base pointer BP1 is of the negative or positive direction. As a result, in response to the inputted distance d, the EXOR gate 204 outputs a signal designating d or a logical negation thereof $\bar{d}$.

An adder 203 is disposed to add each other the value of the base pointer BP1 of the latch circuit 201 and an output from the EXOR gate 204. In this operation, the adder 203 produces an output BP+d+1 or BP+d depending on the value of a carrier input C1. Since BP+d+1 is possibly considered to be equivalent to BP−d, the output from the adder 203 is expressed as BP−d or BP+d. In this description, it is assumed that the distance d does not exceed the width of the loop area, namely, |d |<(Loop area width).

On the other hand, the upper-limit address and lower-limit address values of the loop area designated by the bank number are beforehand stored in the respective data hold circuits, namely, the upper-limit and lower-limit value hold circuits 205 and 206, respectively. In response to a specification of a bank number, the upper-limit and lower-limit value hold circuits 205 and 206 respectively outputs therefrom the upper-limit and lower-limit address values of the specified loop area. The result of the addition from the adder 203 is fed to magnitude comparators i.e. comparators 210T and 210B to be respectively compared with the outputs from the upper-limit and lower-limit value hold circuits 205 and 206, respectively. As a result, it is judged to decide whether or not the computation result from the adder 203, namely, BP±d is smaller than the lower-limit address of the loop area specified by bank number "1" and whether or not the result is larger than the upper-limit address thereof, thereby transferring a judge decision signal to a selector circuit 211.

In addition, the upper-limit and lower-limit values respectively produced from the hold circuits 205 and 206 are delivered to a subtracter 207. A result of a subtraction accomplished by the subtracter 207 indicates a width of the loop area and is sent to a subtracter 208 and an adder 209. The subtracter 208 subtracts the result of the computation of the subtracter 207 from that of the computation of the adder 203 to carry out a correction when BP+d exceeds the upper-limit of the address. The adder 209 adds the result of computation of the adder 203 to that of the subtracter 207 to conduct a correction when BP−d is equal to or less than the lower-limit of the address.

The selector 211 is responsive to comparison signals from the comparators 210T and 210B to select the output from the adder 203, the subtracter 208, or the adder 209 when the computation result BP±d is within the loop area, more than the upper-limit address value, or not exceeding the lower-limit address value, respectively. The selected output signal is latched by an address latch 212 to be employed as an actual address of the RAM.

In the case where the contents of the base pointers to the respective loop areas are updated for each sampling period, it is necessary to update the contents of the base pointers such that for each loop area, the updated values change in a loop or in a periodic manner.

In the address generating circuit of the prior art, the lower-limit and upper-limit address values are specified for the related loop areas to establish a plurality of loop areas each having an arbitrary width so that an address is assigned in each loop area by designating a value BP±d including a distance relative to a point indicated by a base pointer of the loop area.

However, as shown in FIG. 5, the amount of the hardware components constituting the address generator of this type will be considerably increased. For example, in the case where a pointer includes eight bits and the number of loop areas is four, when the latch circuit 201 related to the base pointer is configured with latches each using 16 transistors for each bit, 512 transistors are required to configure the latch circuit 201. Disposing additionally the subtracters 207 and 208 and the adder 209, a total of 576 transistors are required for the configuration.

The increase in the number of hardware components above soars the production cost and the processing time is also adversely influenced, which becomes a factor preventing a high-speed processing of the address generator.

SUMMARY OF THE INVENTION

It is therefore an object of the present invention to provide an address generating circuit capable of being constituted with a reduced amount of hardware components, decreasing the production cost, and increasing the processing speed, thereby solving the problem above.

In accordance with the present invention, the address generating circuit includes first latch means for latching therein a base pointer value, first adder/subtracter means for receiving an output from the first latch means, first data hold means for holding loop width information corresponding to loop area information and outputting loop width information depending on a specified loop area information, second adder/subtracter means for receiving by a first input thereof an output from the first data hold means and receiving by a second input thereof an output from the first adder/subtracter means, second data hold means for holding loop area information, coincidence detecting means for detecting coincidence between the loop area specifying information and an output from the second data hold means, selecting means for receiving the output from the first adder/subtracter means and the output from the second adder/subtracter means for selecting and outputting either one of the output from the first adder/subtracter means and the output from the second adder/subtracter means depending on a detection results from the coincidence detecting means, and latch means for latching therein an output from the selecting means.

In the address generating circuit in accordance with the present invention, even for an address configuration associated with a plurality of loop areas, an address can be assigned by designating a bank number and a distance relative to a position indicated by a base pointer. Consequently, the amount of hardware components can be decreased as compared with the conventional circuit configuration; furthermore, the processing speed of the address computation can be increased.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
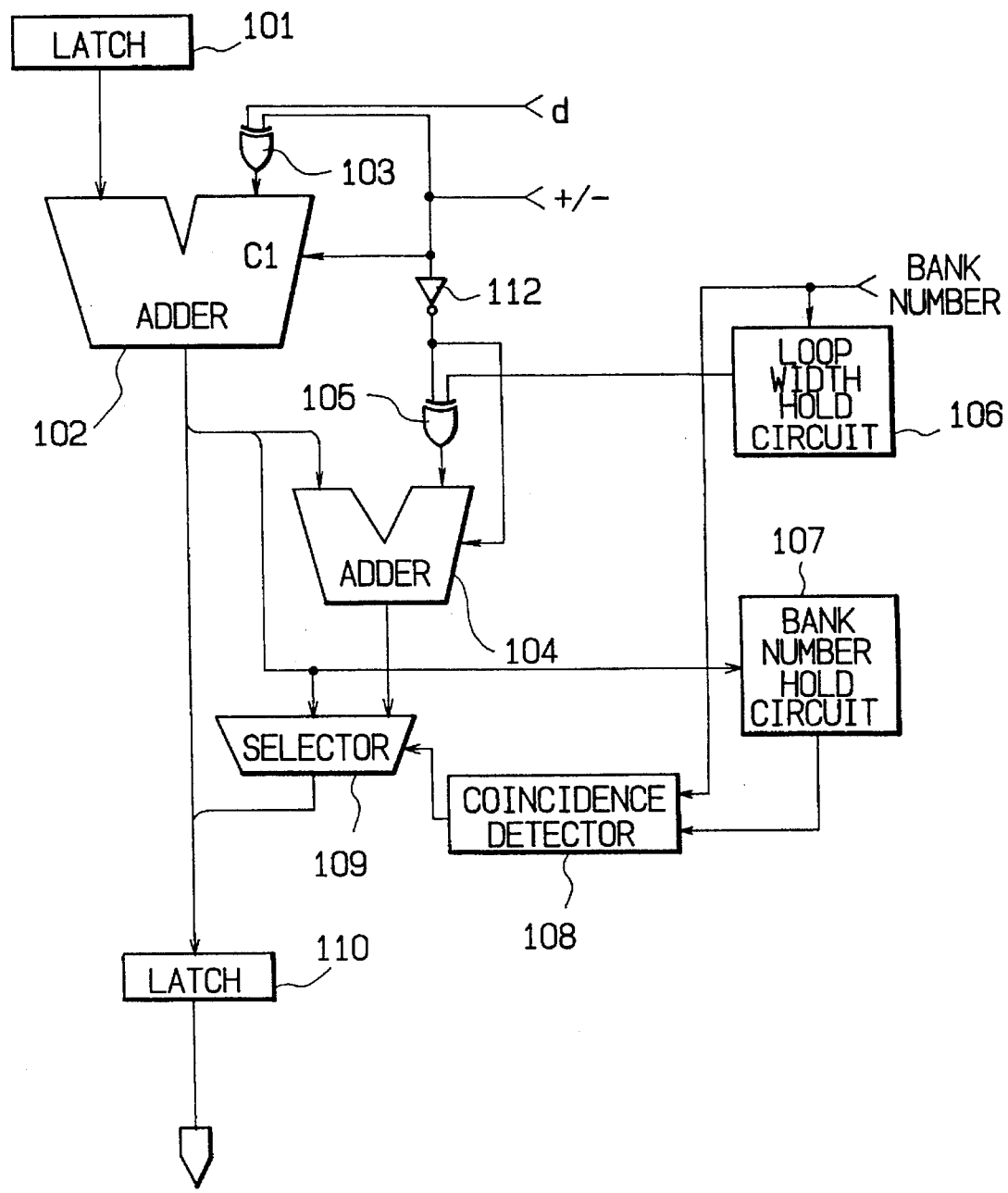
FIG. 1 is a schematic block diagram showing the configuration of an address generating circuit in a first embodiment in accordance with the present invention.

Referring now to the drawings, a description will be given in detail of the address generating circuit in accordance with the present invention.

Figure 2:
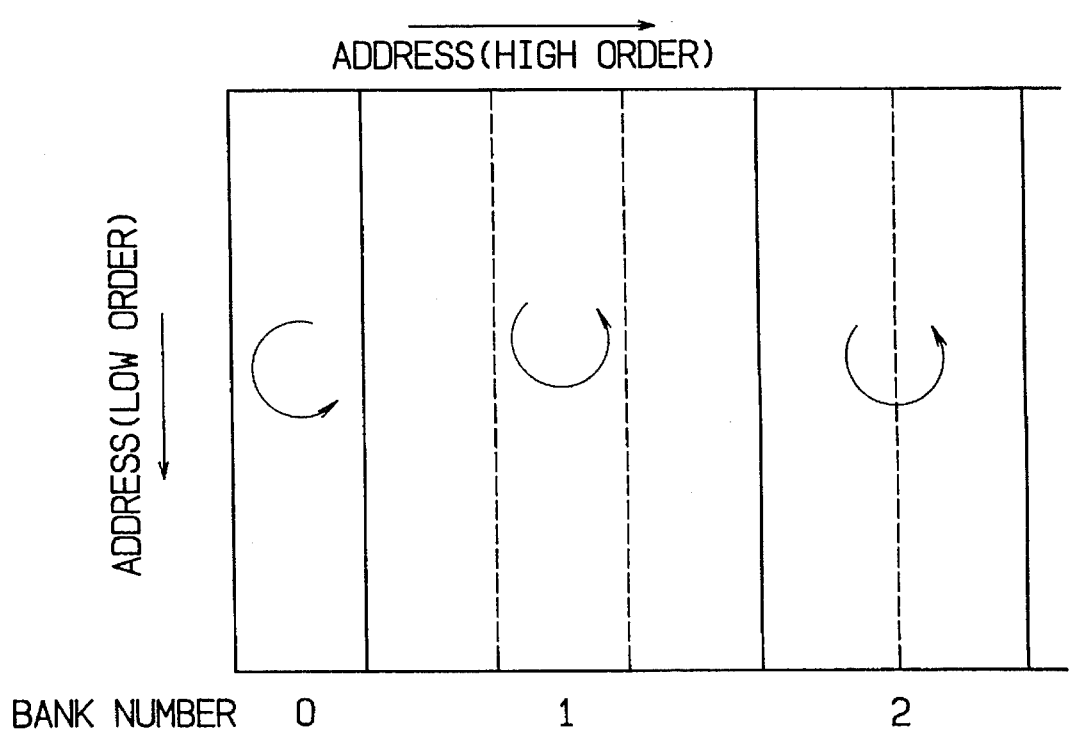
FIG. 2 is a memory map useful to explain the operation of the address generating circuit in accordance with the present invention.

FIG. 2 shows the bank configuration of a memory to be accessed by an address produced from the address generating circuit of the present invention.

In this configuration, an address includes a high-order address and a low-order address, which are respectively expressed by high-order and low-order bits of an address value assigned to the address. A loop area is assigned such that a demarkation point of the loop is specified by the high-order address. In consequence, when an n-bit address value is split into a high-order bit and m low-order bits, the minimum width of the loop and the maximum number of banks are represented as $2^m$ and $2^l$, respectively. Namely, the capacity of the low-order bits is equal to the width of each loop area, and the high-order bit designates one of the loop areas.

In accordance with the present invention, when the memory address is constituted as above, in response to an address specified by a distance d relative to a position indicated by a base pointer (BP) of an arbitrary loop area designated by a bank number, the address generating circuit creates an actual address associated with the specified address.

FIG. 1 shows the structure of an address generator circuit in a first embodiment according to the present invention.

In this circuit system, a base pointer to be updated at an interval of a unit of period of time including a predetermined number of sampling periods (Fs) is commonly applied to all banks. The bank number is related to the high-order address, whereas information on the low-order address is common to all banks. Consequently, in order to update the content of a loop area depending on a bank number, there is required only one latch circuit for a base pointer.

The address generator of FIG. 1 includes latch circuits 101 and 110, adders 102 and 104, EXOR gates 103 and 105, a loop width hold circuit 106, a bank number hold circuit 107, a coincidence detector circuit 108, and a selector circuit 109.

The latch circuit 101 for a base pointer produces an output to be fed to one of the inputs of the adder 102. Another input of the adder 102 receives an output from the EXOR gate 103, the output being resultant from an EXOR operation accomplished between a specified distance d and a signal ± denoting a direction in which the distance d is specified. Consequently, the adder 102 and the EXOR gate 103 can cooperatively accomplish an addition/subtraction processing. The adder 102 produces an output of address data by adding or subtracting the distance d relative to a position indicated by the base pointer to or from the value loaded in the base pointer depending on the specified direction.

The loop width hold circuit 106 includes a memory in which bank widths are stored. When a bank number is specified, the hold circuit 106 outputs therefrom data indicating a band width of the specified bank to one of the inputs of the EXOR gate 105. Other one of the inputs thereof is supplied with a value obtained by inverting the ± signal by an inverter 112. The EXOR gate 105 sends its output to one of the inputs of the adder 104. The other input of the adder 104 receives (1+2) bits of the high-order address of the address data delivered from the adder 102. Using these data items, the adder 104 and the EXOR gate 105 cooperatively carry out an addition or subtraction processing. This processing is conducted with an input of (1+2) bits including the high-order address, a carry in the addition/subtraction, and a sign.

Data equivalent to a bit resultant from the addition or subtraction achieved by the EXOR gate 105 and the adder 104 is fed to one of the inputs of the selector circuit 109. Other one of the inputs thereof is supplied with data of a bit obtained as a result of the computation executed by the adder 102. The bank number hold circuit 107 is a data hold circuit producing, based on the computation result from the adder 102, a signal indicating to which one of the loop areas the address data outputted from the adder 102 belongs. If there exists an area related to the address data, a bank number of the area is fed to the coincidence detector circuit 108. Otherwise, a signal causing the coincidence detector circuit 108 to produce an non-coincidence signal is delivered to the coincidence detector circuit 108. The coincidence detector circuit 108 compares the inputted bank number with that received from the bank number hold circuit 107 to determine whether or not these items match each other, thereby transferring a selection signal to the selector circuit 109.

In response to the signal outputted from the coincidence detector circuit 108, the selector circuit 109 selects and outputs the signal created from the adder 102 or the computation result from the adder 104 depending on whether the coincidence is detected or not, respectively. That is, if the bank number obtained by an address generated from the adder 102 is equal to the specified bank number, the address received from the adder 102 is directly outputted from the selector circuit 109. Otherwise, the loop width is increased or decreased through an addition or a subtraction by the adder circuit 104 to attain an address indicating the specified bank and then the address is outputted from the selector circuit 109.

The latch circuit 110 latches m bits associated with the low-order address resultant from the computation of the adder 102 together with one bit selected by the selector circuit 109.

With the provisions of the circuit constitution and the memory bank numbers, when an address BP±d is specified in an arbitrary one of the banks, there is obtained an actual address for the specified address.

Subsequently, a specific example of the address generation will be described.

One assumption that the memory has a capacity of 256 words and the three high-order bits and five low-order bits are respectively related to the high-order and low-order sides, consider a case where an address is specified in an area of one of four banks, the bank having a bank number "2" as an objective loop area having a loop width associated with an address range from 40H to BFH.

Under the conditions above, when the content of the base pointer is 43H, namely, "43" in the hexadecimal notation and the distance d is 45H, the first adder/subtracter i.e. the adder 102 receives 43H and 45H through its respective input terminals. The adder 102 resultantly produces an output "088H". In order to prevent a wrong operation from occurring due to a carry, the bit width of the computation result "088H" is larger than the address bit width by two bits. Three high-order bits of the computation result "088H" are fed to the bank number hold circuit 107. In this case, the bank number is two. The coincidence detector circuit 108 compares the inputted bank number with an output from the bank number hold circuit 107. Since these input items match each other, the selector circuit 109 selects the output from the adder 102. In consequence, an address "88H" is latched by the latch circuit 110.

Thereafter, however, if the content of the base pointer is changed to A4H, the adder 102 outputs a value OE9H. Three high-order bits "07H" are supplied to the second adder/subtracter circuit i.e. the adder 104. The loop width hold circuit 106 outputs a value 4H and hence the adder 104 produces a value 3H to be fed to the selector circuit 109. On the other hand, through operations of the bank number hold circuit 107 and the coincidence detector circuit 108, it is determined that the bank number of the loop area is unequal to the inputted bank number so as to produce a signal of the non-coincidence. Consequently, the selector circuit 109 selects and outputs the computation results from the adder 104. As a result, the address latch circuit 110 latches, as an actual address, a result "69H" obtained by adding 03H to the five low-order bits.

In accordance with the embodiment, even when the address configuration includes a plurality of loop areas, an address can be specified by designating a bank number and a distance relative to a position denoted by a base pointer of the bank. Moreover, with the provision above, the amount of hardware components can be minimized when compared with the conventional example as described above. For example, like in the conventional case, when the address pointer includes eight bits, namely, when four loop areas are allocated in a 256-word RAM, the base pointer occupies a word and only 128 transistors are required. That is, the number of transistors is minimized to one fourth as compared with the configuration of the prior art. When n areas are allocated, the number is reduced to 1/n of that of the conventional system. Furthermore, the circuit for correcting the address in a loop or in a periodic manner is constituted with a (1+2)-bit adder, a 1-bit coincidence detector circuit, and a RAM loaded with bank numbers. Namely, the hardware size is reduced when compared with the conventional circuit configuration. In addition, the processing speed of the address computation is resultantly increased.

Figure 3:
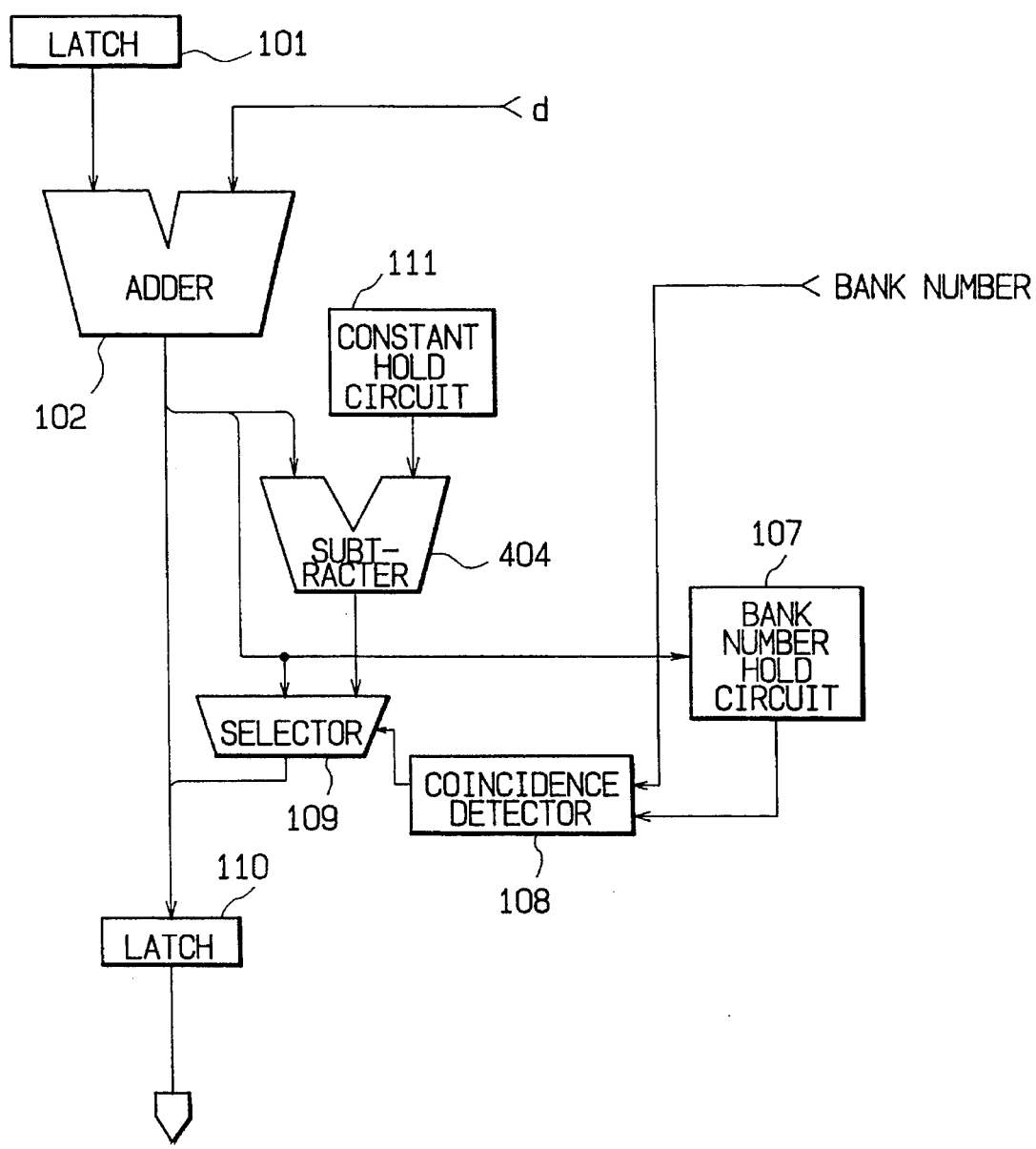
FIG. 3 is a block diagram schematically showing the configuration of an address generating circuit in a second embodiment in accordance with the present invention.
Figure 4:
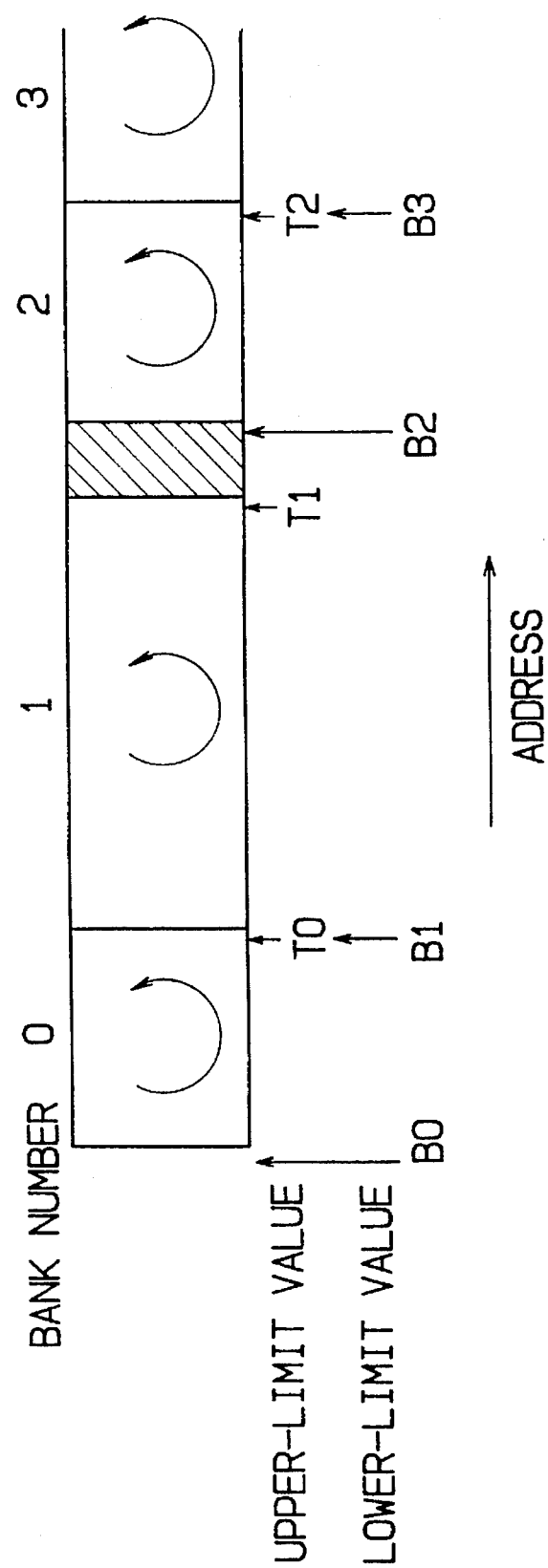
FIG. 4 is a memory map for explaining a conventional method of generating an address.
Figure 5:
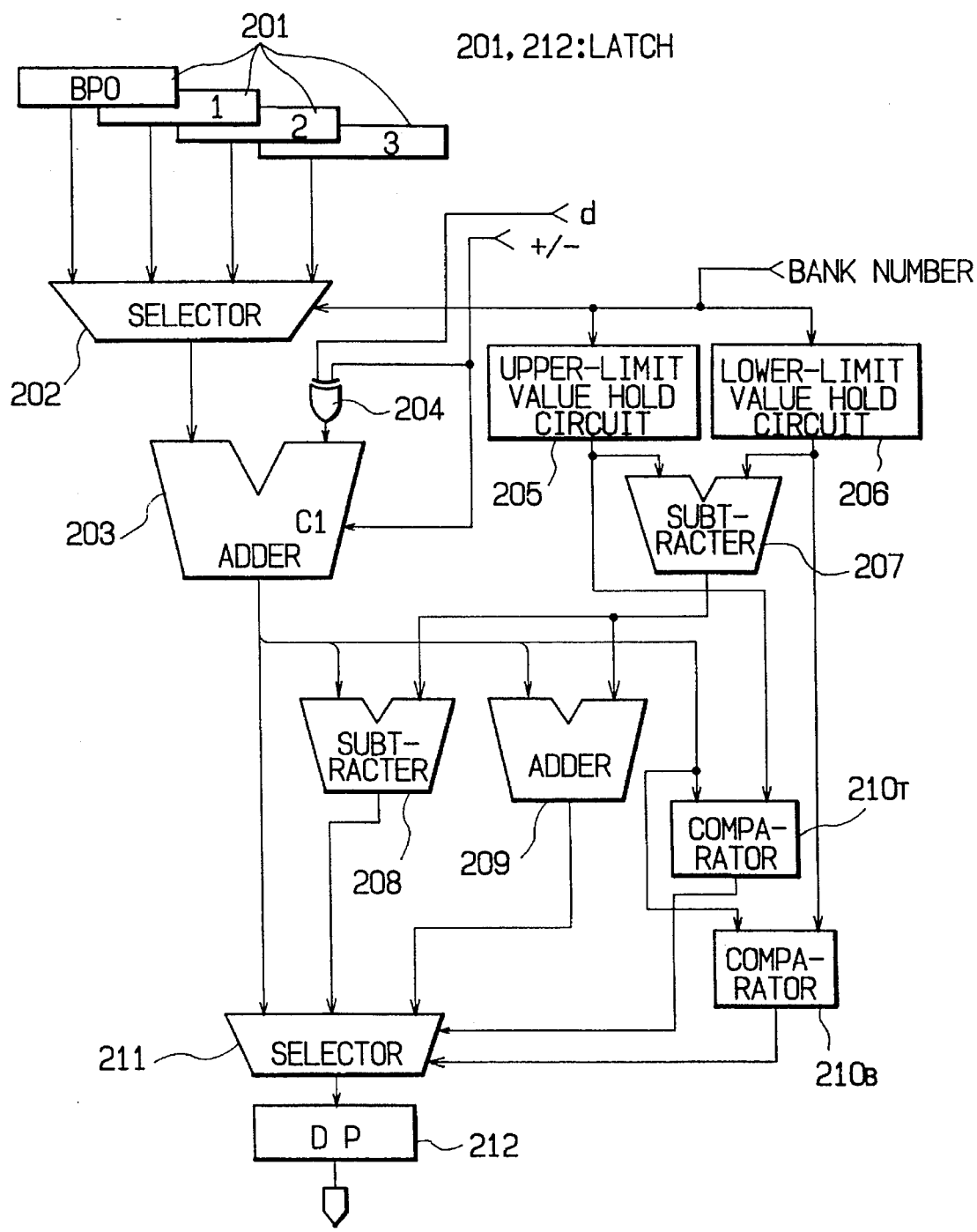
FIG. 5 is a block diagram showing an example of the constitution of a conventional address generating circuit.

FIG. 3 shows the configuration of an address generating circuit in a second embodiment in accordance with the present invention. In the second embodiment of FIG. 3, all of the loop widths are the same. The base pointer address and the data d to be added are positive numbers which are specified to be smaller than the address value of the loop width.

The address generating circuit as shown in FIG. 3 is formed by latch circuits 101, 110, adder 102, subtractor 404, constant hold circuit 111, selector 109, bank number hold circuit 1071 and coincidence detector 108. All these parts except for the subtractor 404 and constant hold circuit 111 have the same functions as those described in connection with the first embodiment of FIG. 1.

An address outputted from the latch 101 and the positive input number d are inputted for the operation of addition into adder 102. In the constant hold circuit 111, the loop width in common with all the banks is stored, and then inputted to one input of the subtractor 404. The output from the adder 102 is inputted to the other input of the subtractor 404. The output from the adder 102 is also inputted to the bank number hold circuit 107. Then, a bank number responsive to the address outputted from the adder 402 is outputted to the coincidence detector 108. The bank number to which BP belongs is inputted to the coincidence detector 108 where it is compared to the bank number stored in the bank number hold circuit 107. Afterward, a coincidence or non-coincidence result is outputted to the selector 109. The latter inputs the outputs from the adder 102 and subtractor 404. When the input from the coincidence detector 108 indicates "coincidence", the content of adder 402 is outputted to latch circuit 110. When the input from the coincidence detector 108 indicates "Non-coincidence", the content of subtractor 404 is outputted to latch circuit 110.

In this circuit system, the loop width is identical for all banks and the distance d is specified in the positive direction relative to a position indicated by the base pointer. When the loop width is set as a constant to a constant hold circuit 111 such that the loop width is supplied to the subtracter 404, the addressing is achieved in a manner similar to that of the first embodiment.

As described above, in accordance with the present invention, the address generating circuit can be constituted with a reduced amount of hardware components, which minimizes the cost thereof and increases the processing speed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An address generating circuit comprising:

a latch means (101) for temporarily latching a base address value of a base pointer (Bp);

a first arithmetic circuit means (102, 103) for receiving an output from said latch means as a first value and receiving an address distance value (d) as a second value and for performing one of addition and subtraction operations between said first value and said second value to output a first address composed of a first set of most significant bits and a first set of least significant bits;

a data hold means (106; 111) for holding loop width information of a memory bank, said loop width information including a second set of most significant bits;

a second arithmetic circuit means (104; 404), coupled to said first arithmetic circuit means (102; 103) and said data hold means (106; 111), to receive said first set of most significant bits of said first address and said second set of most significant bits of said loop width information and for performing one of addition and subtraction operations therebetween to output partial address information;

a selection signal producing means (107, 108) responsive to said first set of most significant bits of said first address, for producing a selection signal that assumes a first level when said first address is within said memory bank and a second level when said first address is outside of said memory bank;

a selecting means (109), coupled to said first arithmetic circuit means (102; 103) and said second arithmetic circuit means (104; 404), to receive said first set of most significant bits of said first address and said partial address information for outputting said first set of most significant bits of said first address when said selection signal assumes said first level and said partial address information when said selection signal assumes said second level; and an output means (110), coupled to said first arithmetic circuit means (102; 103) and said selecting means (109), for outputting a second address that has a third set of most significant bits composed of one of said first set of most significant bits of said first address and said partial address information that is outputted by said selecting means (109) and a second set of least significant bits composed of said first set of least significant bits of said first address.

2. The address generating circuit according to claim 1, and further comprising an inverter means (112), receiving a given data (±) and being coupled to said second arithmetic circuit means to output an inverted data thereto, said second arithmetic circuit means outputting said partial address information in dependence on said inverted data.

3. An address generating circuit comprising:

a first latch means (101) for temporarily latching a base address value of a base pointer (Bp);

a first arithmetic circuit means (102) for receiving an output from said first latch means (101) as a first value and a given address distance value (d) as a second value and for performing one of addition and subtraction operations between said first value and said second value to output a first address composed of a first set of most significant bits and a first set of least significant bits;

a first data hold means (106) for holding a set of loop width data each corresponding to any of a plurality of numbered memory banks and for outputting a specified one of said loop width data that is specified by a given first memory bank number, said specified one of said loop width data including a second set of most significant bits;

a second arithmetic circuit means (104), coupled to said first arithmetic circuit means (102) and said first data hold means (106), to receive said first set of most significant bits of said first address and said second set of most significant bits of said specified one of said loop width data and for performing one of addition and subtraction operations therebetween to output partial address information;

a second data hold means (107), coupled to said first arithmetic circuit means (102), to receive said first set of most significant bits of said first address for outputting a second memory bank number to which a memory address indicated by said first address belongs;

a coincidence detecting means (108) for receiving said first memory bank number and said second memory bank number to output a selection signal that assumes a first level when said first memory bank number is equal to said second memory bank number and a second level when said first memory bank number is unequal to said second memory bank number;

a selecting means (109), coupled to said first arithmetic circuit means (102) and said second arithmetic circuit means (104), to receive said first set of most significant bits of said first address and said partial address information for outputting said first set of most significant bits of said first address when said selection signal assumes said first level and said partial address information when said selection signal assumes said second level; and a second latch means (110), coupled to said first arithmetic circuit means (102) and said selecting means (109), for outputting a second address that has a third set of most significant bits composed of one of said first set of most significant bits of said first address and said partial address information that is outputted by said selecting means (109) and a second set of least significant bits composed of said first set of least significant bits of said first address.

4. The address generating circuit according to claim 3, and further comprising an inverter means (112), receiving a given data (±) and being coupled to said second arithmetic circuit means to output an inverted data thereto, said second arithmetic circuit means outputting said partial address information in dependence on said inverted data.

5. An address generating circuit comprising:

a first latch means (101) for temporarily latching a base address value of a base pointer (Bp);

an adder (102) for receiving an output from said first latch means (101) and a given address distance value (d) and performing an addition operation therebetween to output a first address composed of a first set of most significant bits and a first set of least significant bits;

a first data hold means (111) for holding an output of a constant data representing a loop width of an arbitrary one of a plurality of numbered memory banks, said constant data including a second set of most significant bits;

a subtracter means (404), coupled to said adder means (102) and said first data hold means (111), for receiving said first set of most significant bits of said first address and said second set of most significant bits of said constant data and performing a subtraction operation therebetween to output partial address information;

a second data hold means (107), coupled to said adder means (102), for receiving said first set of most significant bits of said first address to output a first memory bank number to which a memory address indicated by said first address belongs;

a coincidence detecting means (108) for receiving said first memory bank number and a given second memory bank number to output a selection signal that assumes a first level when said first memory bank number is equal to said second memory bank number and a second level when said first memory bank number is unequal to said second memory bank number;

a selecting means (109), coupled to said adder means (102) and said subtracter means (404), for receiving said first set of most significant bits of said first address and said partial address information to output said first set of most significant bits of said first address when said selection signal assumes said first level and said partial address information when said selection signal assumes said second level; and a second latch means (110), coupled to said adder means (102) and said selecting means (109), for outputting a second address that has a third set of most significant bits composed of one of said first set of most significant bits of said first address and said partial address information that is outputted by said selecting means (109) and a second set of least significant bits composed of said first set of least significant bits of said first address.

6. An address generating circuit for a memory consisting of a plurality of numbered memory banks each accessible in a looping manner, said address generating circuit generating a target address data representing a target address in said memory in response to a combination of a first given data (d) representative of a relative distance of said target address to a varying base address in said memory, a second given data (±) representative of an algebraic sense of said relative distance and a given first bank number data representative of a first bank number identifying an associated one of said plurality of memory banks with said base address, said address generating circuit comprising:

means for receiving a base pointer (Bp) indicating said base address;

a first latch means (101) for latching a current value of said base pointer (Bp) to thereby output a first address data composed of a first area data consisting of a plurality of first most significant bits cooperatively identifying, as a first relevant area, an arbitrary one of a plurality of equi-width memory areas in said memory and a first intra-area data consisting of a plurality of first least significant bits cooperatively defining said base address in said first relevant area, said plurality of first most significant bits and said plurality of first least significant bits cooperating with each other to constitute a predetermined bit width;

a first arithmetic circuit means (102, 103), coupled to said first latch means, for determining a first algebraic addition between said first address data and said first given data (d) in dependence on said second given data (±) to thereby output a second address data composed of a second area data including a plurality of second most significant bits cooperatively identifying, as a second relevant area, a related one of said plurality of memory areas to a resultant address from said first algebraic addition and a second intra-area data consisting of a plurality of second least significant bits cooperatively defining said resultant address in said second relevant area;

a first data hold means (106) for holding a plurality of loop width data each including a plurality of stored most significant bits cooperatively representing a predetermined loop width of a corresponding one of said plurality of memory banks;

said first data hold means (106) responding to said first bank number data to output from among said plurality of loop width data a corresponding loop width data to one of said plurality of memory banks identified by said first bank number;

an inverter means (112) for inverting said second given data (±) to output an inverted data;

a second arithmetic circuit means (104, 105), coupled to said inverter means, for determining a second algebraic addition between said second area data and said corresponding loop width data in dependence on said inverted data to thereby output a third area data including a plurality of third most significant bits cooperatively identifying among said plurality of memory areas a respective area with a result of said second algebraic addition;

a second data hold means (107) for holding a plurality of second bank number data each identifying an associated one of said plurality of memory banks with an arbitrary one of said plurality of memory areas;

said second data hold means (107) responding to said plurality of second most significant bits to output from among said plurality of second bank number data a second bank number data representative of a second bank number identifying an associated one of said plurality of memory banks with said second relevant area;

a coincidence detecting means (108), coupled to said first data hold means and said second data hold means, for detecting a coincidence between said first bank number represented by first bank number data and said second bank number represented by said representative second bank number data;

said coincidence detecting means (108) outputting a coincidence signal when detecting said coincidence and a non-coincidence signal when not detecting said coincidence;

a selecting means (109), coupled to said coincidence detecting means, for selecting said plurality of second most significant bits in response to said coincidence signal or said plurality of third most significant bits in response to said non-coincidence signal to output as a fourth area data; and a second latch means (110), coupled to said selecting means, for latching said fourth area data and said second intra-area data to thereby output as said target address data a third address data composed of said fourth area data and said second intra-area data, said third address data having said predetermined bit width.

* * * * *